United States Patent
Chien et al.

(10) Patent No.: US 10,036,939 B2
(45) Date of Patent: Jul. 31, 2018

(54) BIAXIALLY-TILTED DIGITAL MICROMIRROR PROJECTOR

(71) Applicants: Qisda Optronics (Suzhou) Co., Ltd., Suzhou, Jiangsu (CN); Qisda Corporation, Taoyuan (TW)

(72) Inventors: Chih-Shiung Chien, Taoyuan (TW); Ming-Kuen Lin, Taoyuan (TW)

(73) Assignees: Qisda Optronics (Suzhou) Co., Ltd., Suzhou (CN); Qisda Corporation, Taoyuan (TW)

(*) Notice: Subject to any disclaimer, the term of this patent is extended or adjusted under 35 U.S.C. 154(b) by 0 days.

(21) Appl. No.: 15/468,082

(22) Filed: Mar. 23, 2017

(65) Prior Publication Data

US 2017/0293209 A1   Oct. 12, 2017

(30) Foreign Application Priority Data

Apr. 8, 2016 (TW) ............................. 105111081 A

(51) Int. Cl.

| G03B 21/28 | (2006.01) |
|---|---|
| G03B 21/00 | (2006.01) |
| G02B 26/08 | (2006.01) |
| G02B 27/14 | (2006.01) |
| G03B 21/20 | (2006.01) |

(52) U.S. Cl.
CPC ....... *G03B 21/008* (2013.01); *G02B 26/0833* (2013.01); *G02B 27/144* (2013.01); *G03B 21/2066* (2013.01); *G03B 21/28* (2013.01)

(58) Field of Classification Search
CPC .. G03B 21/008; G03B 21/28; G03B 21/2013; G03B 21/2033; H04N 9/31; H04N 9/3102
See application file for complete search history.

(56) References Cited

U.S. PATENT DOCUMENTS

| 2009/0190101 A1* | 7/2009 | Alasaarela | G02B 5/04 |
|---|---|---|---|
| | | | 353/81 |
| 2012/0242912 A1* | 9/2012 | Kitano | H04N 9/3111 |
| | | | 348/759 |
| 2015/0138446 A1* | 5/2015 | Sheng | G03B 21/008 |
| | | | 348/766 |

(Continued)

FOREIGN PATENT DOCUMENTS

| CN | 102789122 | 11/2012 |
|---|---|---|
| CN | 103048862 | 4/2013 |
| CN | 104656350 | 5/2015 |

*Primary Examiner* — Sultan Chowdhury

(57) ABSTRACT

A projector includes an illumination system, a biaxially-tilted digital micromirror device (DMD), a first prism, a second prism and a lens. The illumination system provides an incident light. The biaxially-tilted DMD having two opposite first long sides and two opposite first short sides receives the incident light and converts the incident light into an image light. The first prism is disposed between the illumination system and the DMD, and includes a first face and a second face connected and adjacent to the first face. The second prism is disposed between the first prism and the DMD and includes a third face, a fourth face and a fifth face; and the third face is connected and adjacent to the fourth face and fifth face. The fourth face has two opposite second long sides and two opposite second short sides. The lens receives and projects the image light.

10 Claims, 4 Drawing Sheets

(56) References Cited

U.S. PATENT DOCUMENTS

2015/0160454 A1\* 6/2015 Bhakta ................ F21S 48/1145
362/513
2016/0037147 A1\* 2/2016 Kempf ................ H04N 9/3188
348/744

\* cited by examiner

BIAXIALLY-TILTED DIGITAL MICROMIRROR PROJECTOR

FIELD OF THE INVENTION

The present invention relates to a projector, and more particularly, to a projector having a biaxially-tilted digital micromirror device (DMD).

BACKGROUND OF THE INVENTION

By utilizing the principle of imaging and a digital micromirror device, a projector may project a micro image onto a huge screen, and provide sufficient brightness, so as to share image information to the audience.

FIG. 1 is a schematic diagram illustrating the component configuration of a conventional projector. As shown in FIG. 1, the conventional projector 1 includes a digital micromirror device 10, a total internal reflection (TIR) prism set 11, and a reflector 12, a lens module 13, and a light guide tube 14. To define the viewing direction, the right side of FIG. 1 shows the three axes of the Cartesian coordinate system. In FIG. 1, the X-axis is the direction from the origin to the right side, the Y-axis is the direction from the origin to the lower side, and the Z-axis is the direction pointing toward the plane. In the conventional projector 1, a light passes through the lens module 13 via the light guide tube 14, and is then reflected to the TIR prism set 11 by the mirror 12; finally, the imaging light is transmitted to the lens via the digital micromirror device 10 to be projected onto the screen. However, due to physical limitations of conventional uniaxial rotating digital micromirror device 10, the uniaxial rotating DMD in the conventional projector 1 can only accept oblique incident light. Therefore, the TIR prism set 11 is inclined for an angle (e.g., 45 degrees) with respect to the digital micromirror device 10, thus limiting the volume of the conventional projector 1. To date, the size of the conventional projector 1 is too large for miniaturization of the projector, leading to lack of convenience and gradually losing competitiveness.

Therefore, it is very important to develop a projector with a smaller size.

SUMMARY OF THE INVENTION

To achieve the above-mentioned objectives, the present invention provides a projector that includes an illumination system, a biaxially-tilted DMD, a first prism, a second prism, and a lens. The illumination system is adapted for emitting an incident light. The biaxially-tilted DMD is adapted for receiving the incident light and convert the incident light into an image light. The biaxially-tilted DMD is a first rectangle having two opposite first long sides and two opposite first short sides. The first prism is disposed between the illumination system and the biaxially-tilted DMD, the first prism includes a first face and a second face connected and adjacent to the first face; wherein, the incident light passes through the first face and the second face in sequence. The second prism is disposed between the first prism and the biaxially-tilted DMD. The second prism includes a third face, a fourth face and a fifth face; the third face is connected and adjacent to the fourth face and the fifth face; the fourth face faces the biaxially-tilted DMD; the incident light passes through the third face, the fourth face sequentially and is transmitted to the biaxially-tilted DMD. The image light passes through the fourth face and is reflected by the third face, followed by passing through the fifth face, and is then transmitted to the lens. The fourth face is a second rectangle having two opposite second ling sides and two opposite second short sides; the second long sides are parallel to the first long sides, and the second short sides are parallel to the first short sides. The lens is opposite to the fifth face, and is adapted for receiving and projecting the image light.

In an embodiment of the present invention, the illumination system includes a light source module, a first lens set and a second lens set. The light source module is adapted for emitting the incident light. The first lens set is disposed between the first prism and the light source module and is close to the light source module; the first lens set is adapted for transmitting the incident light. The second lens set is disposed between the first lens set and the first prism, and is adapted for transmitting the incident light coming from the first lens set.

In an embodiment of the present invention, an effective focal length of the first lens set is greater than or equal to 12 mm and less than or equal to 30 mm.

In an embodiment of the present invention, an effective focal length of the second lens set is greater than or equal to 30 mm and less than or equal to 50 mm.

In an embodiment of the present invention, the illumination system further includes a reflection module and a shielding member. The reflection module is disposed between the first lens set and the second lens set; and the reflection module is adapted for reflecting the incident light coming from the first lens set to the second lens set. The shielding member is disposed between the first lens set and the reflection module.

In an embodiment of the present invention, the first lens set includes a first lens and a second lens. The second lens set includes a third lens. The first lens is disposed between the light source module and the second lens, the second lens is disposed between the first lens and the reflection module, and the third lens is disposed between the reflection module and the first prism. The second lens includes a first light output surface facing the reflection module, and the third lens includes a light incident surface facing the reflection module. The first light output surface and the reflection module are spaced apart for a first distance D1, the reflection module and the light incident surface are spaced apart for a second distance D2, the light incident surface and the biaxially-tilted DMD are spaced apart for a third distance D3, and $0.5 \leq D3/(D1+D2) \leq 1$.

In an embodiment of the present invention, the sum of the first distance D1 and the second distance D2 is greater than or equal to 20 mm and equal to or less than 50 mm.

In an embodiment of the present invention, the third distance D3 is greater than or equal to 20 mm and equal to or less than 50 mm.

In an embodiment of the present invention, the second lens is an aspherical lens.

In an embodiment of the present invention, the first prism has a refractive index that is smaller than a refractive index of the second prism.

In an embodiment of the present invention, the above-mentioned second prism is an isosceles right triangular prism.

The projector according to the embodiments of the present invention includes a biaxially-tilted DMD; and spatial configuration of components and optical paths thereof are designed according to the characteristics of the biaxially-tilted DMD. Due to the characteristics of the biaxially-tilted DMD, no extra angle would exists between the prism set (combination of the first prism and the second prism) and the DMD. Therefore, spatial configuration of components and optical design thereof are optimized, thus achieving the purpose of reducing the size of the projector.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
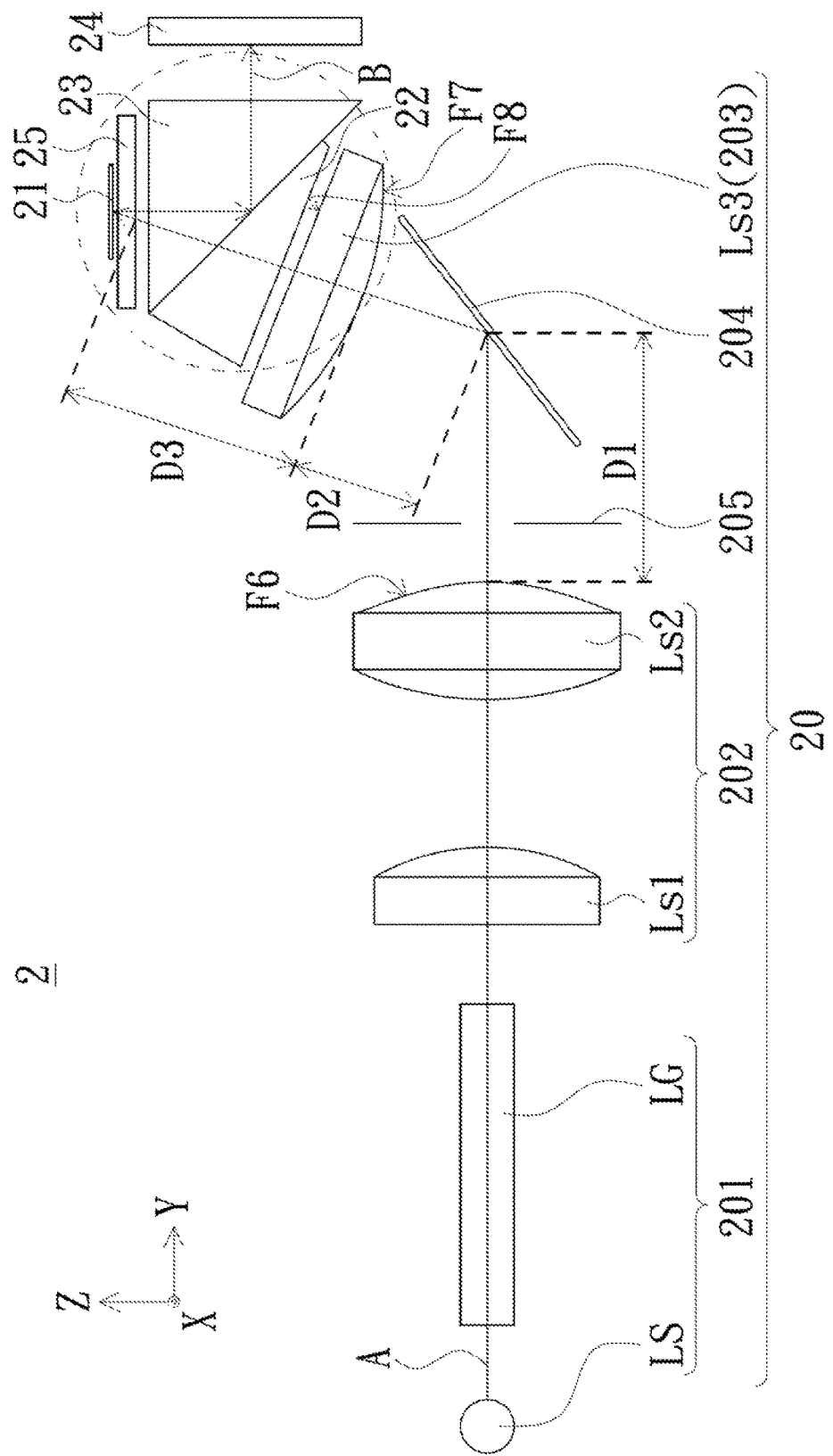
FIG. 2 is a schematic diagram of the configuration of a projector according to an embodiment of the present invention.
Figure 3:
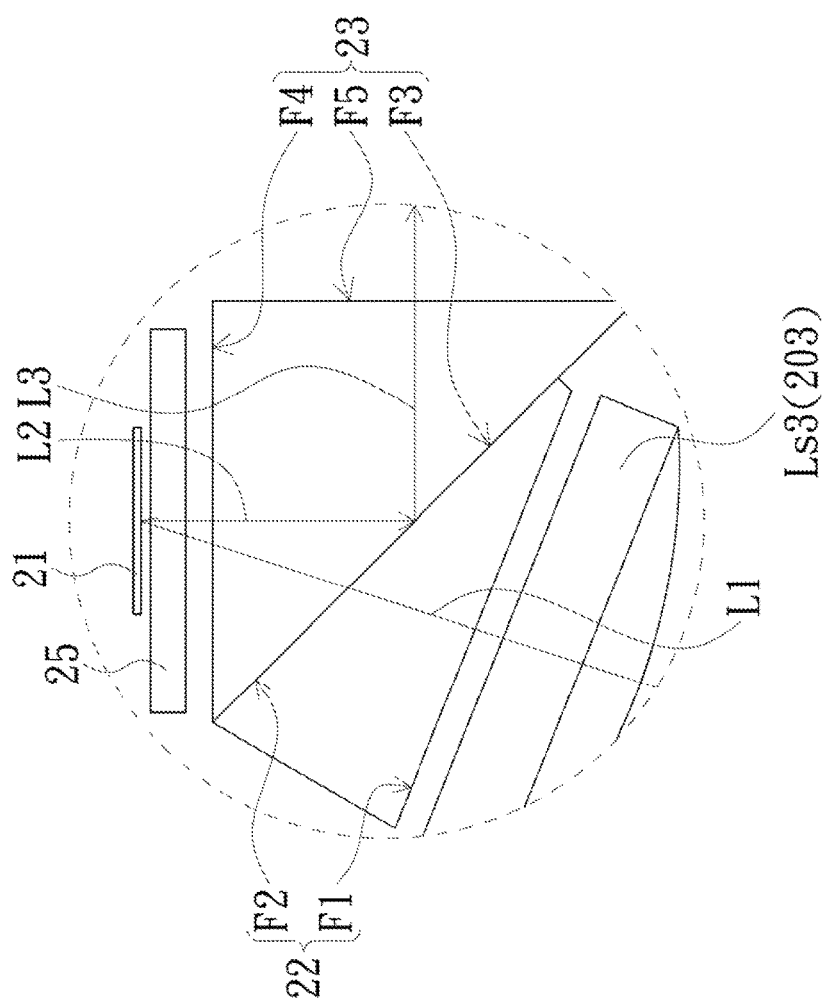
FIG. 3 is a partially enlarged schematic view of the configuration of the projector shown in FIG. 2.
Figure 4:
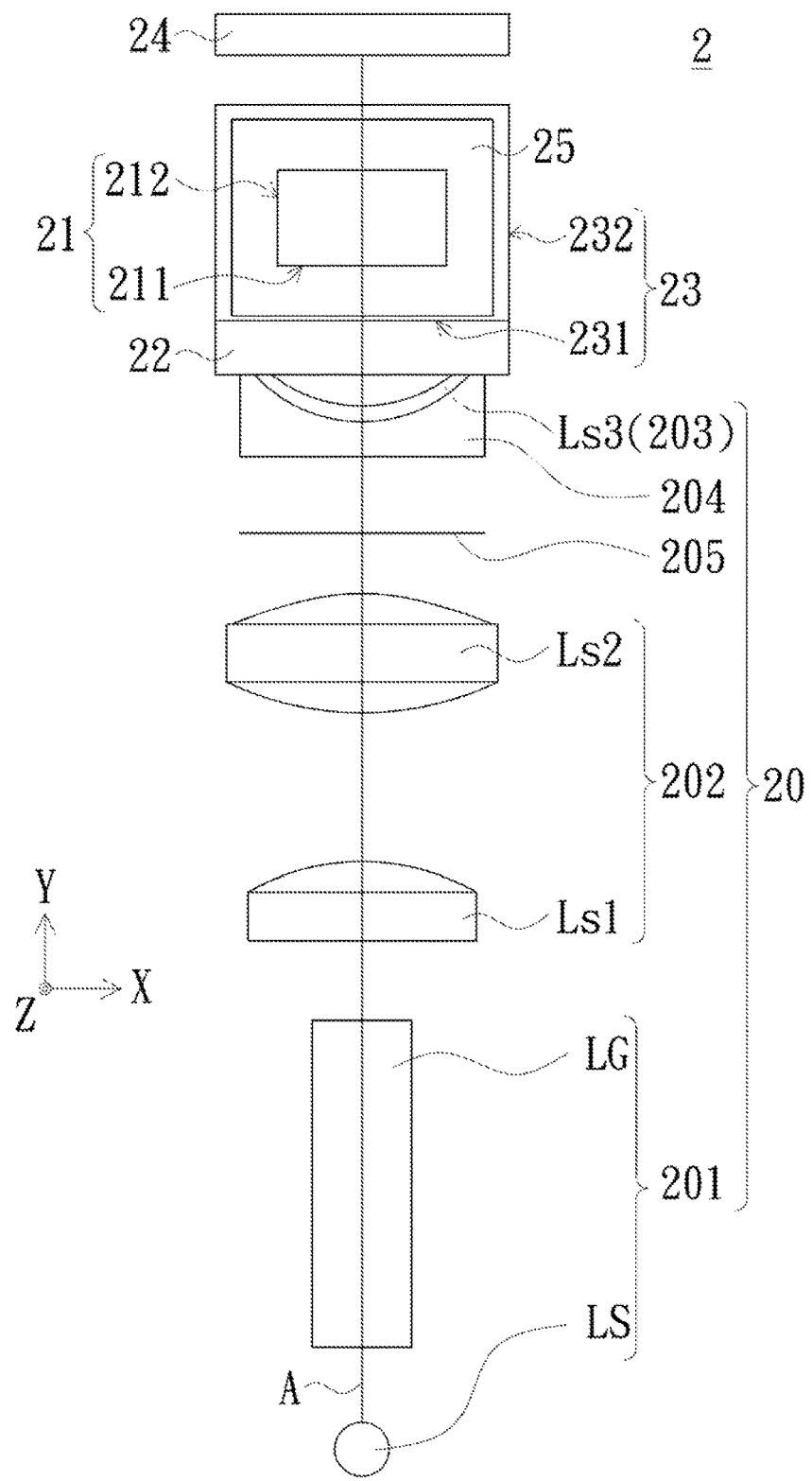
FIG. 4 is a top schematic view of the configuration of the projector shown in FIG. 2.

Please refer to FIG. 2 to FIG. 4. FIG. 2 is a schematic diagram of the configuration of a projector according to an embodiment of the present invention. FIG. 3 is a partially enlarged schematic view of the configuration of the projector shown in FIG. 2. FIG. 4 is a top schematic view of the configuration of the projector shown in FIG. 2. As shown in FIG. 2 to FIG. 4, The projector 2 of the present embodiment includes an illumination system 20, biaxially-tilted DMD 21, a first prism 22, a second prism 23, and a lens 24. The illumination system 20 is adapted for emitting an incident light A. The biaxially-tilted DMD 21 is covered by a cover glass 25 and is adapted for receiving the incident light A emitted by the illumination system 20 and converting the incident light A into an image light B. In particular, the biaxially-tilted DMD 21 is a TRP (Tilt & Roll Pixel) DLP® Pico™ chipset manufactured by Texas Instruments Incorporated. The biaxially-tilted DMD 21 includes a plurality of micromirrors for reflecting the incident light A to form the image light B, and the outer configuration of the biaxially-tilted DMD 21 is, for example, a rectangular planner device, which includes two opposite first long sides 211 and two opposite first short sides 212. More particularly, in the present embodiment, the micromirrors (not shown) of the biaxially-tilted DMD 21 may be flipped between an ON state and an OFF state; when the micromirrors are in the ON state, the micromirrors flip 12° along each of two diagonals sequentially, equivalent to flipping 17° along the direction of the first long side 211 (X-axial direction), so that the incident light A is reflected to form the image light B at an angle of about 34° to 36°. The first prism 22 is disposed between the illumination system 20 and biaxially-tilted DMD 21. The first prism 22 includes a first face F1 and a second face F2 connected and adjacent to the first face F1. The second prism 23 is disposed between the first prism 22 and the biaxially-tilted DMD 21; the second prism 23 includes a third face F3, a fourth face F4 and a fifth face F5, wherein the third face F3 is connected and adjacent to the fourth face F4 and the fifth face F5, the fourth face F4 faces the biaxially-tilted DMD 21, and the fifth face F5 faces the lens 24. The fourth face F4 of the second prism 23 is, for example, a rectangular face, which includes two opposite second long sides 231, and two opposite short sides 232. The second long sides 231 are parallel to the first long sides 211 of the biaxially-tilted DMD 21, and the second short sides are parallel to the first short sides 212 of the biaxially-tilted DMD 21. In the present embodiment, the second prism 23 is, for example, an isosceles right triangle prism; however, it is not to limit the scope of the present invention. The lens 24 is opposite to the fifth face F5 of the second prism 23, and the lens 24 is adapted for receiving and projecting the image light B.

When the illumination system 20 emits the incident light A, the incident light A passes through first face F1 and the second face F2 of the first prism 22, the third face F3 and the fourth face F4 of the second prism 23 sequentially, and is then transmitted to the biaxially-tilted DMD 21. Meanwhile, the biaxially-tilted DMD 21 reflects the incident light A and converts the incident light A into the image light B. When biaxially-tilted DMD 21 is in an ON state, the image light B passes through the fourth face F4 of the second prism 23 and is transmitted to the third face F3; the image light B is then reflected by the third face F3 to the fifth face F5, passes through the fifth face F5, and is transmitted to the lens 24. More particularly, the optical path of the incident light A and the image light B will be described as follows.

The configuration of the components of the projector 2 according to the present embodiment will be further described as below.

As shown in FIG. 2, the illumination system 20 of the present embodiment includes a light source module 201, a first lens set 202 and a second lens set 203. The first lens set 202 is disposed between the first prism 22 and the light source module 201 and close to the light source module 201. The second lens set 203 is disposed between the first lens set 202 and the first prism 22. The light source module 201 includes the light source LS and the light guiding element LG; the light source LS is adapted for emitting the incident light A; the light guiding element LG is disposed between the light source LS and the first lens set 202. The above-mentioned light guiding element LG, the first lens set 202 and the second lens set 203 are all used for transmitting the incident light A emitted from the light source LS, and both of the first lens set 202 and the second lens set 203 have the physical property of focusing light and thus focus the incident light A, so that the incident light A may be projected exactly onto the biaxially-tilted DMD 21. In the present embodiment, the effective focal length of the first lens set 202 is, for example, longer than or equal to 12 mm and shorter than or equal to 30 mm; and the effective focal length of the second lens set 203 is, for example, longer than or equal to 30 mm and shorter than or equal to 50 mm. It is to be specified that, the values of the above-mentioned effective focal lengths of the first lens set 202 and the second lens set 203 are only one of the embodiments of the present invention, and is not to limit the scope of the invention. In other embodiments, different ranges of the effective focal lengths may be applied according to system configuration for different products.

As shown in FIG. 2, the illumination system 20 of the present embodiment further includes a reflection module 204. The reflection module 204 is disposed between the first lens set 202 and the second lens set 203, and the reflection module 204 is adapted for reflecting the incident light A from the first lens set 202 to the second lens set 203. Furthermore, a shielding member 205 may be disposed between the first lens set 202 and the reflection module 204 so that the shielding member 205 may block undesired light from entering the lens 24 when the first lens set 202 focuses the incident light A in front of the reflection module 204, thereby effectively improving the image quality. It is to be noted that the reflection module 204 and the shielding member 205 are only one of the embodiments of the present invention, but the present invention is not limited to this. In other embodiments, the reflection module 204 and the shielding member 205 may be removed from the configuration of the projector 2 in response to actual needs of the products.

Specifically, as shown in FIG. 2, the first lens set 202 of the present embodiment includes a first lens Ls1 and a second lens Ls2, and the second lens set 203 includes a third lens Ls3. In the present embodiment, the first lens Ls1 is, for example, a spherical lens; the second lens Ls2 is, for example, an aspherical lens; and the third lens Ls3 is, for example, a spherical lens. However, the present invention is not limited thereto; a spherical lens or an aspherical lens may be chosen as the first lens Ls1, the second lens Ls2, and the third lens Ls3 according to actual needs and use. The first lens Ls1 is disposed between the light guiding element LG of the light source module 201 and the second lens Ls2. The second lens Ls2 is disposed between the first lens Ls1 and the reflection module 204, and the third lens Ls3 is disposed between the reflection module 204 and the first prism 22. In the present embodiment, the second lens Ls2 has a light output surface F6 facing the reflection module 204, and the third lens Ls3 has a light incident surface F7 facing the reflection module 204. The light output surface F6 of the second lens Ls2 is spaced apart from the reflection module 204 for the first distance D1, the reflection module 204 is separated from the light incident surface F7 of the third lens Ls3 for the second distance D2, and the light incident surface F7 of the third lens Ls3 is separated from the biaxially-tilted DMD 21 for the third distance D3. It is to be noted that the first distance D1, the second distance D2 and the third distance D3 satisfy the equation: $0.5 \leq D3/(D1+D2) \leq 1$. In the present embodiment, the sum of the first distance D1 and the second distance D2 is, for example, greater than or equal to 20 mm and smaller than or equal to 50 mm. The third distance D3 is, for example, greater than or equal to 20 mm and smaller than or equal to 50 mm. However, the present invention is not limited thereto. The sum of the first distance D1 and the second distance D2 and the third distance D3 may be different numerical ranges depending on the system configuration of different products. When the first distance D1, the second distance D2, and the third distance D3 satisfy the equation: $0.5 \leq D3/(D1+D2) \leq 1$, overall size of the projector 2 of the present embodiment may be effectively reduced without the optical path being affected by mechanistic interference.

It is to be noted that, in this embodiment, the third lens Ls3 has a gap between the light output surface F8 facing the first prism 22 and the first face F1 of the first prism 22; but the present invention is not limited thereto. In other embodiments, the light output surface F8 of the third lens Ls3 is, for example, connected to the first face F1 of the first prism 22.

The optical path of the incident light A and the image light B of the projector 2 of the present embodiment will be described in further detail below.

As shown in FIGS. 2 and 3, the light source LS of the present embodiment emits the incident light A, which is immediately received by the light element LG. In this embodiment, the light guiding element LG is, for example, a wedge-shaped light guide. That is, a light guiding element LG receives the incident light A with a light incident area larger than the light output area of the output incident light A, hence effectively improving the coupling efficiency. When the incident light A passes through the light guiding element LG, the first lens Ls1, the second lens Ls2, the shielding member 205, the reflection module 204 and the third lens Ls3 sequentially, it is vertically incident on the first face F1 of the first prism 22. That is, the incident direction of the incident light A is parallel to the normal vector of the first faces F1. The incident light A travels in the first prism 22 along the optical path L1 and sequentially passes through the second face F2 of the first prism 22 and the third face F3 and the fourth face F4 of the second prism 23, until being reflected by the biaxially-tilted DMD 21 to form the image light B. Specifically, the biaxially-tilted DMD 21 has a first long side 211 and a first short side 212 along the X-axis and Y-axis, respectively, and the fourth face F4 of the second prism 23 has a second long side 231 and the second short side 232 along the X-axis and Y-axis, respectively. Since the second long side 231 of the second prism 23 is parallel to the first long side 211 of the biaxially-tilted DMD 21, the incident light A entering the biaxially-tilted DMD 21 along the optical path L1 on the X-Y plane may be regarded as the incident light A incoming onto the first long side 211 of the biaxially-tilted DMD 21 (i.e., the incident light A and the image light B are reflected on the Y-Z plane as shown in FIG. 2, so that they can be observed as a straight line transmission in the viewing direction along the Z-axis, thereby leading to no additional inclination angle, as shown in FIG. 4). The image light B is transmitted along the optical path L2 in the second prism 23, and passes through the fourth face F4 of the second prism 23 in the second prism 23 until being reflected by the third face F3 of the second prism 23; wherein the reflection is, for example, a total internal reflection. Therefore, the image light B would still be transmitted within the same medium (the second prism 23) after reflection; and when the image light B has been totally reflected by the third face F3, it is transmitted along the optical path L3, and finally passes through the second prism 23 of the fifth face F5 and is transmitted to the lens 24 of the projector 2.

In the present embodiment, the second face F2 of the first prism 22, for example, contacts the third face F3 of the second prism 23; and the refractive index of the second prism 23 is, for example, greater than the refractive index of the first prism 22. Specifically, the refractive index of the first prism 22 is, for example, about 1.51633; and the refractive index of the second prism 23 is, for example, about 1.666718. However, the present invention is not limited thereto. Furthermore, the first prism 22 is, for example, an S-BSL7 glass material manufactured by OHARA Corporation. The second prism 23 is, for example, an S-BAH11 glass material manufactured by OHARA Corporation. However, the present invention is not limited thereto. In other embodiments of the present invention, an air medium may be formed between the second face F2 of the first prism 22 and the third face F3 of the second prism 23. That is, a gap may be formed between the second face F2 of the first prism 22 and the third face F3 of the second prism 23, so that the refractive indexes of the first prism 22 and the second prism 23 need not be considered.

Figure 1:
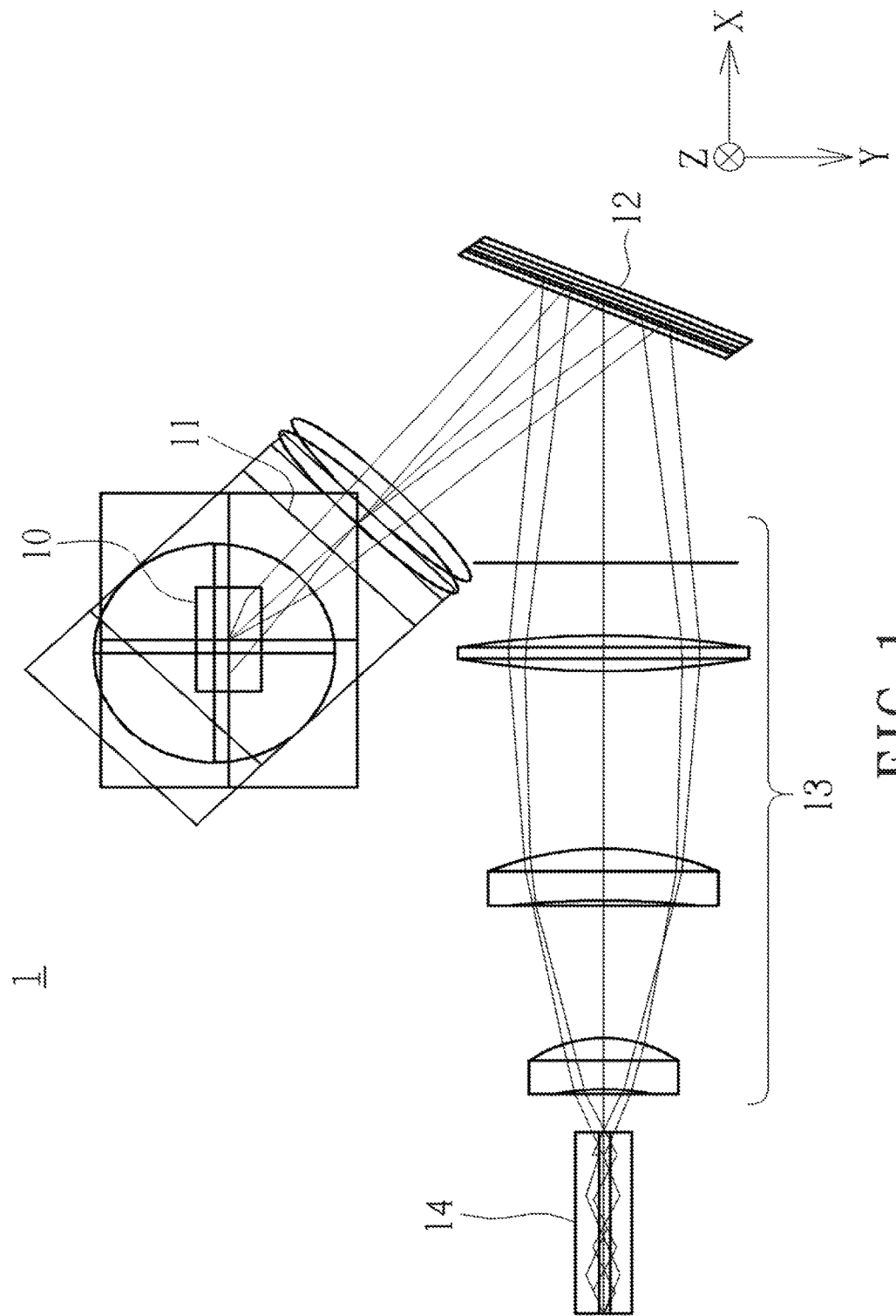
FIG. 1 is a schematic diagram illustrating the configuration of a conventional projector.

To sum up, the projector 2 of the embodiments of the present invention utilizes a biaxially-tilted DMD (i.e., TRP (Tilt & Roll Pixel) DLP® Pico™ chipset). The second long sides 231 of the second prism 23 are parallel to the first long sides 211 of the biaxially-tilted DMD 21 so that the incident light A entering the biaxially-tilted DMD 21 along the optical path L1 on the X-Y plane may be regarded as the incident light A incoming onto the first long side 211 of the biaxially-tilted DMD 21. Therefore, unlike the conventional projector 1 shown in FIG. 1, the TIR prism set 11 is disposed at an inclination angle with respect to the DMD 10 that rotates about a single axis. In addition, spatial arrangement of the components and optical path are designed according to the characteristics of the biaxially-tilted DMD 21 so that no extra inclination angle is present between the prism set (the combination of the first prism 22 and the second prism 23) and the DMD. Therefore, space configuration and optical design of the projector are further optimized, thus achieving the purpose of reducing the size of the projector.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projector, comprising:
    an illumination system, adapted for illuminating an incident light;
    a biaxially-tilted digital micromirror device (DMD), adapted for receiving the incident light and converting the incident light into an image light, the biaxially-tilted DMD being a first rectangular face comprising two opposite first long sides and two opposite first short sides;
    a first prism, disposed between the illumination system and the biaxially-tilted DMD, the first prism comprising a first face and a second face connected and adjacent to the first face, and the incident light passing through the first face and the second face sequentially;
    a second prism, disposed between the first prism and the biaxially-tilted DMD, the second prism comprising a third face, a fourth face, and a fifth face, the third face being connected and adjacent to the fourth face and the fifth face, the fourth face facing the biaxially-tilted DMD, the incident light passing through the third face and the fourth face sequentially and being transmitted to the biaxially-tilted DMD, the image light passing through the fourth face, being reflected by the third face, passing through the fifth face and being transmitted to a lens, wherein the fourth face of the second prism is a second rectangular face comprising two opposite second long sides and two opposite second short sides, the second long sides are parallel to the first long sides, and the second short sides are parallel to the first short sides; and
    the lens, disposed opposite to the fifth face and adapted for receiving and projecting the image light;
    wherein a refractive index of the first prism is smaller than a refractive index of the second prism.

2. The projector according to claim 1, wherein the illumination system comprises:
    a light source module, adapted for emitting the incident light;
    a first lens set, disposed between the first prism and the light source module and adjacent to the light source module, and adapted for transmitting the incident light; and
    a second lens set, disposed between the first lens set and the first prism, and adapted for transmitting the incident light from the first lens set.

3. The projector according to claim 2, wherein an effective focal length of the first lens set is greater than or equal to 12 mm and less than or equal to 30 mm.

4. The projector according to claim 2, wherein an effective focal length of the second lens set is greater than or equal to 30 mm and less than or equal to 50 mm.

5. The projector according to claim 2, wherein the illumination system further comprises:
    a reflection module, disposed between the first lens set and the second lens set, and adapted for reflecting the incident light from the first lens set to the second lens set; and
    a shielding member, disposed between the first lens set and the reflection module.

6. The projector according to claim 5, wherein the first lens set comprises a first lens and a second lens, the second lens set comprises a third lens, the first lens is disposed between the light source module and the second lens, the second lens is disposed between the first lens and the reflection module, the third lens is disposed between the reflection module and the first prism, the second lens comprises a first light output surface facing the reflection module, the third lens comprises a light incident surface facing the reflection module, the first light output surface and the reflection module are spaced apart for a first distance D1, the reflection module and the light incident surface are spaced apart for a second distance D2, the light incident surface and the biaxially-tilted DMD are spaced apart for a third distance D3, and $0.5 \leq D3/(D1+D2) \leq 1$.

7. The projector according to claim 6, wherein a sum of the first distance D1 and the second distance D2 is greater than or equal to 20 mm and equal to or less than 50 mm.

8. The projector according to claim 6, wherein the third distance D3 is greater than or equal to 20 mm and equal to or less than 50 mm.

9. The projector according to claim 6, wherein the second lens is an aspherical lens.

10. The projector according to claim 1, wherein the second prism is an isosceles right triangular prism.

* * * * *